Figure 1:
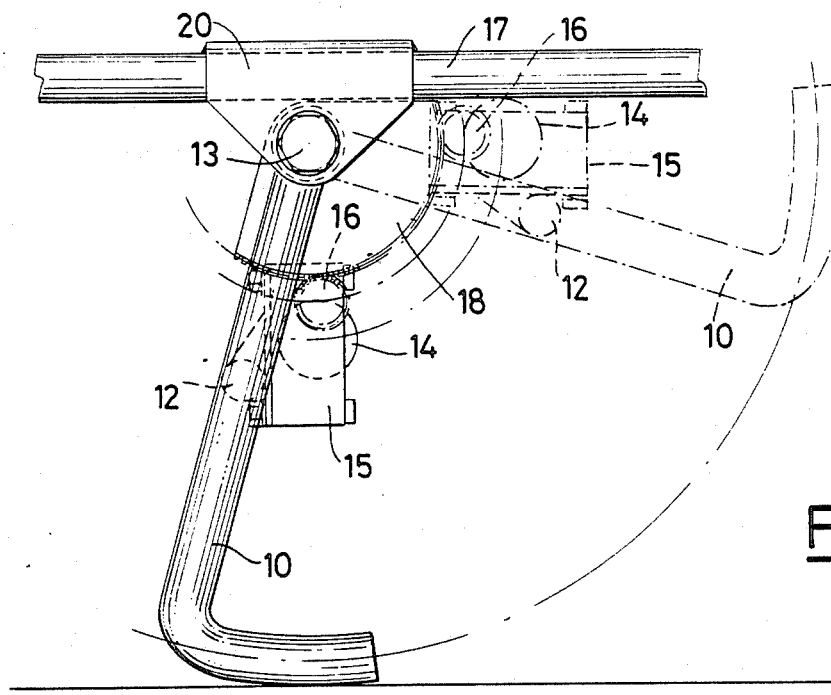

United States Patent [19]

Bernocco

[11] Patent Number: 4,693,488
[45] Date of Patent: Sep. 15, 1987

[54] ELECTRICALLY CONTROLLED MOTORCYCLE STAND

[75] Inventor: Giovanni Bernocco, Cherasco, Italy

[73] Assignee: TEMSIR S.r.l., Cherasco, Italy

[21] Appl. No.: 775,121

[22] Filed: Sep. 11, 1985

[30] Foreign Application Priority Data

Sep. 17, 1984 [IT] Italy ................................ 67929 A/84

[51] Int. Cl.⁴ ............................................. B62H 1/02
[52] U.S. Cl. .................................... 280/293; 280/302; 280/303
[58] Field of Search ................ 280/293, 294, 295, 296, 280/297, 301, 302, 303, 304; 180/219, 271

[56] References Cited

U.S. PATENT DOCUMENTS 3,908,780  9/1975  McClure et al. .................... 180/271
4,084,656  4/1978  Itoh et al. ........................ 280/301 X

FOREIGN PATENT DOCUMENTS 35169   5/1924  Denmark ............................ 280/302
   64354  11/1944  Denmark ............................ 280/293
  439207   1/1927  Fed. Rep. of Germany ...... 280/297
 2913429  10/1980  Fed. Rep. of Germany ...... 280/293
 1221612   1/1960  France .............................. 280/293

Primary Examiner—John J. Love
Assistant Examiner—Mitchell J. Hill
Attorney, Agent, or Firm—Young & Thompson

[57] ABSTRACT

On a motorcycle stand there is mounted an electric motor, actuated by a pushbutton or switch, which motor, through a reducer unit, rotates a pinion; this latter meshes with a sector gear of the stand, whose center coincides with the hinging axis on which the stand is hinged on the motorcycle; actuation of the motor produces the sliding of the pinion on the sector gear and, accordingly, the rotation of the stand between the two conventional end positions called operative and rest position, respectively.

1 Claim, 3 Drawing Figures

ELECTRICALLY CONTROLLED MOTORCYCLE STAND

This invention relates to an electrically controlled motorcycle stand.

High piston displacement motorcycles, in particular, have a considerable weight and therefore compel the owner to carry out a considerable effort to put the motorcycle on the stand; this effort is even greater when the motorcycle has to be parked on sloping roads.

It is an object of the invention to provide a motorcycle having an electrified control so as to allow the owner of the motorcycle to put the stand into both an operative and a rest position by simply actuating a pushbutton or switch and without having to exert any effort onto the motorcycle.

It is a second object of the invention to provide an electrically controlled stand which will allow rendering perfectly stable the motorcycle even when parked on a sloping road.

It is a third object of the invention to equip the motorcycle with an auxiliary antitheft device, by providing an electrified stand which will be able to be rotated into the rest position only by actuating the special pushbutton or switch operable only when the the ignition key is inserted.

To attain these and other objects, which will be better explained later, the invention proposes to provide an electrically controlled motorcycle stand characterized in comprising an electric motor, operated by a pushbutton or switch, which rotates a pinion which meshes with a sector gear of the stand and whose center coincides with the hinging axis on which the stand is hinged on the motorcycle, in order to rotate the stand between the two conventional end positions called operative and rest position, respectively.

Figure 2:
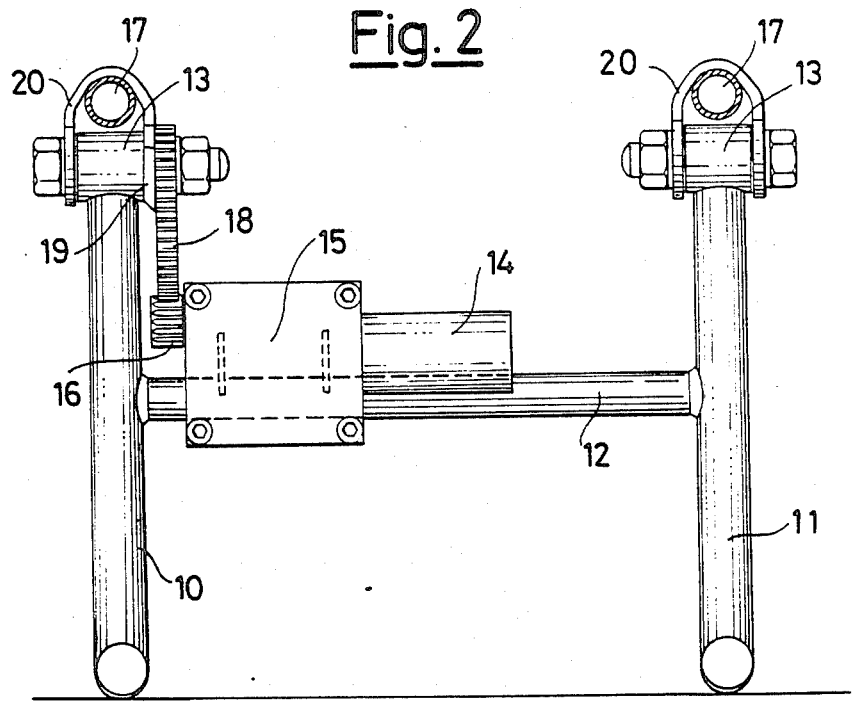
Figure 3:
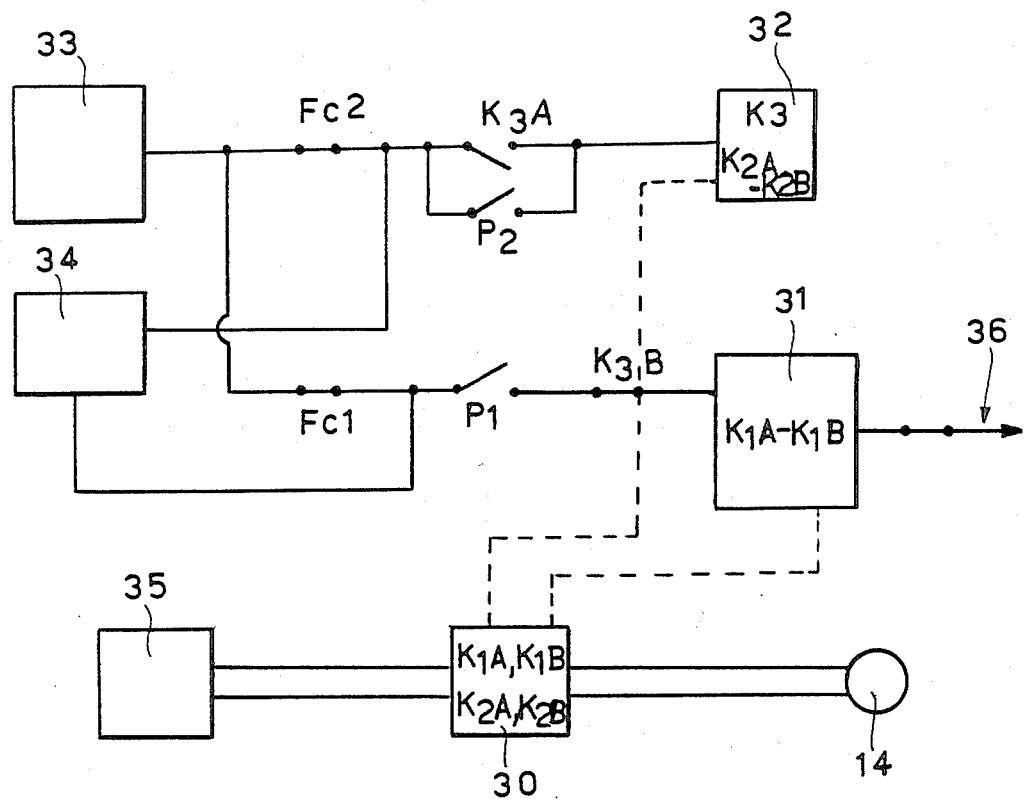

A preferred but certainly not limiting embodiment of the invention will now be described with reference to the annexed drawings, in which:

FIG. 1 is a side view of the motorcycle stand according to the invention, showing, in continuous lines, its operative position and in dashed lines its rest position, FIG. 2 is a front view showing the stand of FIG. 1 in its rest position, FIG. 3 is a diagram of the electric control circuit of the stand.

A conventional stand is composed of the two arms 10 and 11 rigidly interconnected by means of a cross member 12 and hinged at 13 on the frame 17 of the motorcycle.

According to the invention, on the cross member 12 an electric motor 14 is mounted. A speed reducer 15 is interposed between the shaft of the motor and a pinion 16, so as to allow the power of the motor 14 to be used efficiently with a relatively low number of revolutions of the pinion 16.

Pinion 16 meshes with a sector gear 18, fastened to the frame 17, such that its axis coincides with the hinge 13 connecting the stand to the frame itself.

The operation of the device is as follows.

By actuating a pushbutton or switch disposed on the handle bar of the motorcycle the motor 14 is controlled and, accordingly, pinion 16 is made to rotate through the reducer 15.

Since pinion 16, when being rotated, slides on the sector gear 18, the stand 10 rotates between the two end positions shown in FIG. 1, i.e. the operative and the rest position, respectively. The power of the motor 14 will allow the rotation of the stand in both directions, even when a person is seated on the motorcycle, thus facilitating the operations.

Advantageously, the electric circuit will be conceived in such a manner as to allow the actuation of the electric motor to take place only when the gear of the motorcycle is in the idle position, in order to prevent the stand from being operated accidentally during the movement of the motorcycle.

In order to prevent a thief from stealing the motorcycle at 19 the sector gear 18 is welded to the bracket 20 on which the stand is hinged, so that only a laborious unwelding operation will allow the separation of the stand from the frame, thus dissuading the thief from trying the theft because it would be impossible for him to rotate the stand into the rest position without having first inserted the ignition key.

The stand according to the invention is operatively controlled by the electric circuit shown diagrammatically in FIG. 3, formed as follows.

A card contains the power relays K1A, K1B, K2A, K2B for the operation of the electric motor 14. In FIG. 3, reference numerals 30 indicate the relevant contacts and, at 31 and 32, the relevant pairs of coils in parallel. The contacts and coils together represent a relay.

A further interlock relay K3 has its coil inserted in parallel with the coils K2A and K2B, as shown diagrammatically at 32.

Two magnetic limit microswitches FC1 and FC2 are applied onto the fixed portion of the stand and each of them is enabled by its own magnet rigidly connected to the rotating part of the stand, or viceversa.

Oscillating double switch pushbuttons P1 and P2 with as many unretained working positions, are applied onto the handle bar of the motorcycle.

Reference numeral 33 indicates the control board with ignition key.

Reference numeral 34 indicates an acoustic and/or luminous signal device. Reference numeral 35 indicates the battery and reference numeral 36 indicates further contacts which are called contacts of the "neutral".

The operation of the circuit is as follows: Assuming a normal condition to be the position shown in FIGS. 1 and 2 in which the stand rests on the ground holding the motorcycle in a lifted position, and the key is inserted and rotated in the control board 33, the upper magnetic limit microswitch FC1, which normally is closed, is now opened by the relevant magnet and thus prevents the current from passing through the contacts of the pushbutton P1. If P1 is pressed inadvertently, since the contacts of the relay K3B normally are closed, it is not possible for the relays K1A and K1B of the motor control circuit to be energized.

Instead, by pressing the pushbutton to close the switch P2, the from the positive terminal passes through the magnetic microswitch FC2, not engaged by its own magnet, and feeds the coils of the relays K3, K2A, K2B in 32, thus energizing them. The interlock relay K3A closes then the contacts in parallel with the contacts of the pushbutton P2 and thus maintains the self-excitation even when the pushbutton P2 is released.

Relay K3B at the same time opens the contacts between the switch P1 and the group 31 and prevents a pressure exerted onto the pushbutton P1 from producing a short circuit on the contacts of the relays K1A and K1B.

Together with relay K3 are excited also the relays K2A and K2B which, by closing the respective contacts, send the positive and the negative phase to the motor 14 of the reducer 15.

When, during the rotation of the movable portion of the stand, the magnet of the magnetic microswitch FC2 becomes situated so that contact FC2 opens, interruption of the positive current to the entire chain by de-energizing the coils of the relays K3, K2A and K2B occurs, thus stopping the stand in the retracted position, with the motorcycle ready to run.

In this condition, as soon as a any speed is obtained, the absence of the signal "NEUTRAL" 36 (i.e., when the motorcycle is in gear) disables the relays K1A–K1B so that any accidental pressures exerted onto the push-button P1 will not lower the the sand, thus obtaining an efficient safety feature when the motorcycle is travelling.

Therefore, to obtain the lifting of the motorcycle it is necessary that no gear be engaged (presence of the "Neutral" signal 36) and that the pressure on the push-button P1 is maintained. In this way, the current passing through the closed FC1, the closed contacts of P1 and the closed contacts of K3B, energizes the relays K1A–K1B which feed the motor of the reducer. As the motorcycle reaches the lifted position, the lower limit magnet opens the contacts of the microswitch FC1 which takes off the positive of the feeding to the coils of the power relays K1A–K1B, with the result that the whole assembly is stopped.

Since the removal of the key from the board 33 interrupts the excitation voltage to the relays, an efficient antitheft condition is obtained, it being impossible to manually retract the stand.

The two magnetic limit microswitches FC1–FC2, when both of them are closed and therefore are in the working condition because they are not engaged by the respective magnets, perform also the important function of activating the acoustic and/or luminous signal device 34 which signals to the driver the operation of the system. The signal ceases only when one of the two limit positions of the stand is attained.

It is obvious that the geared motor unit and the transmission gears may also be disposed in other positions and assume configurations different from those shown, and this in relation with the availability of space and with the requirements of the manufacturers, without affecting the scope of the invention as protected also by the following claims.

I claim:

1. An electrically controlled motorcycle stand comprising: an electric motor having a shaft; a switch which operates said motor; a pinion connected to said shaft and rotatable by said motor and which meshes with and is rotatable on a sector gear; and a hinge through which the stand is connected to a motorcycle, wherein said sector gear is secured to the frame of the motorcycle and has a center which coincides with the hinge such that through the action of the motor and the pinion and the sector gear and the hinge, the stand is made to rotate between two positions which are the lowered operative and the raised rest positions of the stand respectively.

* * * * *